Feb. 7, 1961    E. L. LARSON ET AL    2,970,697
RETRACTABLE SWIRL PLATE AND VERMIN CONTROL
GUARD FOR DRAIN TILE INTAKES
Filed Aug. 19, 1958    2 Sheets-Sheet 1
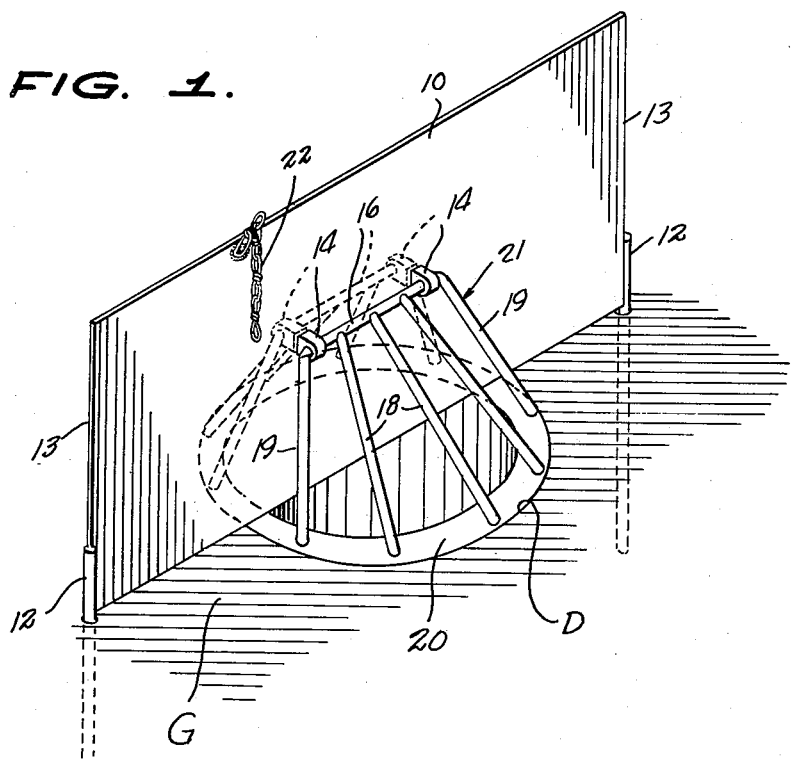
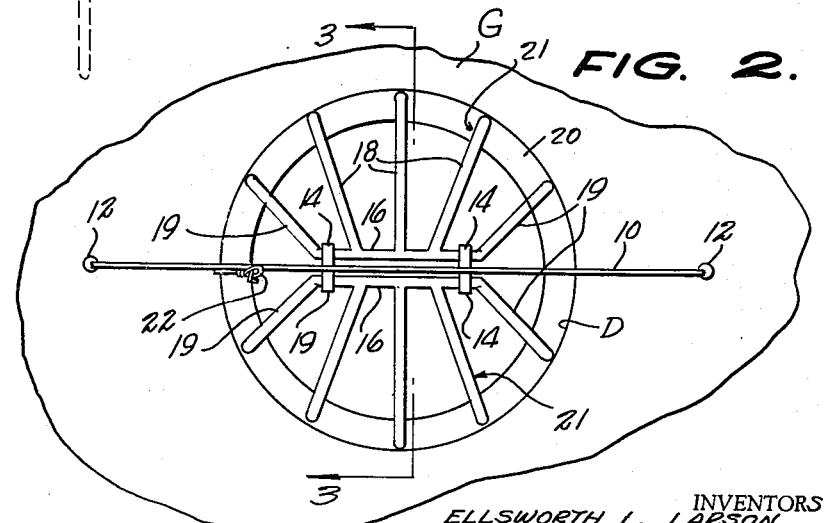
INVENTORS
ELLSWORTH L. LARSON,
LAWRENCE L. LARSON,
ANDY M. LARSON,
BY
*McMorrow, Berman & Davidson*
ATTORNEYS Feb. 7, 1961 E. L. LARSON ET AL 2,970,697
RETRACTABLE SWIRL PLATE AND VERMIN CONTROL
GUARD FOR DRAIN TILE INTAKES
Filed Aug. 19, 1958 2 Sheets-Sheet 2
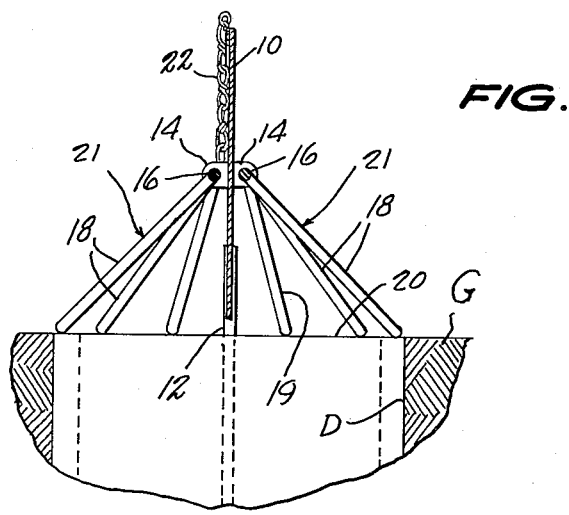
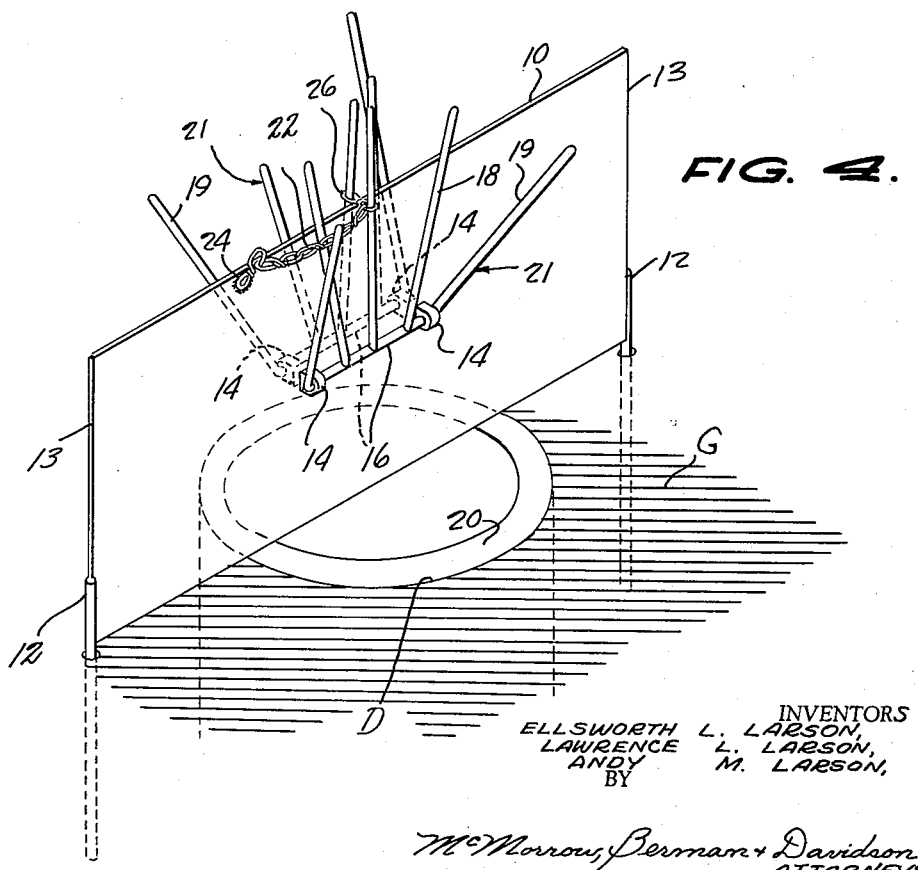

United States Patent Office 2,970,697
Patented Feb. 7, 1961

2,970,697

RETRACTABLE SWIRL PLATE AND VERMIN CONTROL GUARD FOR DRAIN TILE INTAKES

Ellsworth L. Larson, Lawrence L. Larson, and Andy M. Larson, all of Dawson, Minn.

Filed Aug. 19, 1958, Ser. No. 756,043

8 Claims. (Cl. 210—163)

This invention relates to a device mountable in position over the inlet of a drain tile intake, so as to prevent a violent swirling action of water as it enters the conduit, while also providing a grate-like guard adapted to reduce the possibility of entry of debris, small animals, etc.

Conventionally, a drain tile intake is capped by a grate, screen, or related device having openings that will permit water to pass into the conduit while denying entry to small animals, debris, etc.

The provision of protective, apertured covering devices of the character stated prevents clogging of the drain by such vermin and their den material, or by debris or water-borne trash. A familiar, conventional type of device of the character stated, widely in use, is a cast metal, cone-shaped, so-called "beehive" guard.

If such intakes are left unguarded at times when no water is draining into them, as during period of drought or particularly in late fall, winter and early spring, small animals and even birds are prone to enter and use the intakes for dens or nests or places of refuge. Their den material frequently clogs the drain and sometimes the animals are trapped and die, and their bodies obstruct the passage of water through the conduit.

Use of the conventional type of guards is attended by certain disadvantages or handicaps. When the guards are solidly, permanently attached to the intake, they are of course fully effective as vermin guards, but at times when a heavy volume of water is passing into the drain, the openings in the device become clogged by debris and require frequent cleaning. They fail, accordingly, to serve the desired purpose of drainage at the time when drainage is most needed. Should the devices be detachable, they are sometimes misplaced or lost when removed to facilitate drainage, or alternatively, they may be dislodged by vermin seeking an entry to the drain.

Ordinarily, during wet seasons, water-borne debris does not present serious problems, and the guards may be removed for better drainage. However, another factor tending to increase the efficiency of an upright intake is the phenomenon that water entering the drain in great volume will develop a violent swirling or whirlpool type of action, unless the intake is so designed as to provide swirl walls or baffles.

The present invention is intended and designed to remove the disadvantages of conventional drains described above. To this end, the invention, summarized briefly, comprises a flat, imperforate swirl plate adapted to be disposed in a vertical plane, lying diametrically across the top of the intake and extending at its ends radially outwardly from opposite sides of the intake. At the ends of the plate there are provided means, such as stakes, adapted to penetrate the ground surface to maintain the plate in an upright position.

Pivotally mounted upon the opposite faces of the plate, in position over the intake of the drain, are grate members each of which comprises a plurality of spaced rods extending from the swirl plate to the circumference of the intake, so as to overlie half the intake area. The grate members pivot between operative, lower positions and inoperative raised positions in which they are releasably maintained by a suitable means, as for example, a retaining chain carried by the plate. The swirl plate may be permanently installed by being set into the intake during construction of the same. Alternatively, it may be supported in place upon stake legs rigidly attached in the manner referred to above so as to be driven vertically into the ground outside the perimeter of the intake. Then again, the plate might be installed by sleeves, lugs, or other conventional attaching means, directly to the tile intake.

It is an important object of the present invention to provide a device of the character stated wherein there will be an effective interaction between the plate and the grate members, in that the grate members serve a function, additional to their normal function of preventing the entry of vermin or debris. This added function is the bracing of the plate in its upright, operative position against tilting or lateral displacement in either direction.

In this way, the grate members and the swirl plate have a coactive relation. The swirl plate provides a support for the grate members, on which support the grate members are movable into and out of their operative positions. The grate members in turn provide a brace for the swirl plate, holding the same against lateral displacement.

Another important object is to so design the swirl plate that it extends as an imperforate divider between the segments or grate members. Thus, even if one grate member should become clogged by reason of debris carried by water approaching the drain tile from one side of the swirl plate, the swirl plate will prevent the debris from clogging the other grate member. This leaves the other grate member open for the passage of water into the drain tile. To this end, the swirl plate extends not only below the grate members, but also above and even radially outwardly beyond the same, to provide a highly effective separation between the grate members.

Another important object is to design the grate members in such a way that they will decline in a direction outwardly from the swirl plate to the circumference of the intake. This produces an effective positioning of the grate members, such as to add markedly to their efficiency in preventing the admission of debris.

Another object of importance is to so form the device that the grate members, when swung upwardly from their operative positions, are swiftly and easily releasably engaged in their upwardly swung, inoperative positions. Thus, one has full access to the interior of the drain for the purpose of removing drain-clogging material etc.

Still another object of importance is to so design the means that holds the grate members in their inoperative, upwardly swung positions, as to cause a single means to engage both of said grate members in these circumstances.

Still another object of importance is to provide a construction for each grate member which will be inexpensive, and yet possessed of particular efficiency both as regards the guarding action thereof, and the pivotal action. To this end, each grate member includes a pivot rod journaled at its ends in bearing brackets or ears that project outwardly from the swirl plate. Said rod provides a common support or connector bar for a plurality of guard rods or bars extending from the swirl plate to the circumference of the intake.

Still another object is to provide an additional improvement in the pivoted grate member, wherein those guard rods which are mounted upon the opposite extremities of the pivot rod will be disposed in close proximity to the outer surfaces of the respective bearing brackets. These particular guard rods thus will constitute abutments limiting the pivot rod against longitudinal displacement from its assigned position.

Still another object is to so form the device that either grate member can be swung between operative and inoperative positions independently of the other member. In this way the removal of drain-clogging material can be carried out only where absolutely needed, and with minimum interference to the various components of the device.

Yet another object is to provide, in a device of the character stated, a relatively inexpensive construction that will yet be particularly designed for swift and easy installation or removal, according to the needs of the particular situation.

Other objects will appear from the following description, the claims appended thereto, and from the annexed drawings, in which like reference characters designate like parts throughout the several views, and wherein:

Figure 1 is a perspective view of a device according to the present invention, as it appears in use with the grate members in their operative positions;

Figure 2 is a top plan view;

Figure 3 is a transverse sectional view on line 3—3 of Figure 2; and

Figure 4 is a view like Figure 1 in which the grate members have been swung upwardly to their inoperative positions, and have been releasably engaged in said inoperative positions thereof.

Referring to the drawings in detail, designated by the reference numeral 10 is a rectangular, wholly flat plate, which would be formed of sheet metal in a preferred embodiment, the gauge of which would be sufficient to provide the desired rigidity when the plate is subjected to violent buffeting by water entering the drain during storm or flood conditions, etc.

Plate 10, as will be noted from Figure 1, at its opposite ends is provided with vertically depending, elongated, straight anchoring stakes 12. At their upper ends, stakes 12 may be welded or otherwise fixedly secured to the opposite end edges 13 of the plate. Stakes 12 are adapted to be driven into the ground G at locations spaced radially outwardly from diametrically opposed portions of the vertical drain D formed in the ground G.

Welded or otherwise fixedly secured to the opposite faces of the plate 10, midway between the opposite end edges 13, are ears or bearing brackets 14. A pair of ears or brackets is provided upon each face of plate 10, with the brackets of each pair being aligned horizontally and being disposed approximately midway between the top and bottom edges of the plate. Journaled at its ends in brackets 14 is a rockshaft or pivot rod 16, and welded to and projecting outwardly from the pivot rod are elongated guard rods or fingers 18.

In the illustrated example, the fingers 18 may be considered as intermediate fingers, in the sense that they are disposed between the brackets 14 that carry the particular shaft 16 to which said fingers are fixedly secured (see Figure 2). At opposite extremities of the shaft 16 there are provided end fingers 19, these being termed end fingers by reason of the fact that they are disposed outside the space between the brackets 14. The end fingers 19 extend at obtuse angles to the shaft 16, and the angular relation of the end fingers to the length of the shaft causes the end fingers to constitute abutments which will engage each bracket 14 in the event the rod or shaft 16 tends toward axial displacement from its assigned position. At the same time, of course, the fingers 19 do not in any way inhibit the free rockable or rotatable movement of the shaft 16 about its long axis, during the pivoting of each grate member between its operative position shown in Figure 1 and its inoperative position shown in Figure 4.

In the illustrated example, there are three intermediate fingers. The middle one of the intermediate fingers is disposed midway between the ends of the shaft 16, extending in perpendicular relation to the shaft. The fingers 18 disposed at opposite sides of said middle finger diverge in a direction away from the shaft 16, being symmetrically disposed in respect to the middle finger, said other fingers 18 being equidistantly spaced from the middle one of the intermediate fingers. The middle finger is the finger that is greatest in length, of the several fingers. The remaining fingers 18 are slightly shorter than the middle finger, while the end fingers 19 are the shortest fingers. This arrangement is selected in order that the distal ends of the fingers will all come to rest upon the top of the drain tile 20 that is mounted in the drain D, at the circumference of the drain tile.

With the shaft 16 extending in closely spaced, parallel relation to the vertical plane in which the plate 10 lies, and with said shaft 16 terminating at its ends inwardly from the circumference of the drain tile (see Figure 2) it will be seen that the several fingers, in the operative position of each grate member, extend at varying angles to the mentioned vertical plane. This is shown in Figure 3. It will be noted that the end finger 19 appearing in this figure of the drawing is disposed at a comparatively small inclination from the vertical plane. The longest finger, that is, the middle one of the fingers 18, however, is at a much greater inclination from the vertical. The remaining side fingers 18 are inclined at angles that fall between the angles of the middle finger and the angles of the end fingers 19.

All the fingers, of course, may be considered as extending radially from the pivot axis defined by the shaft 16, this being clearly seen from Figure 3.

Each shaft 16 and the fingers 18, 19 secured thereto, may be considered as comprising a grate member generally designated by the reference numeral 21. Two grate members 21 are provided on the device, one at each side of the plate 10, and the two grate members are oppositely arranged though identically formed.

Each grate member, when viewed from above, may be appropriately considered as being approximately semicircular, in the sense that it overlies half the cross-sectional area of the drain D.

In this connection, it is considered that the construction illustrated and described herein is a preferred, novel embodiment. Nevertheless, it is envisioned that the grate member may possibly have other forms. It might, for example, be formed of screen material, with the wire mesh material being carried by a suitably shaped frame. Or, instead of the fingers, there may be provided a slotted plate.

It is also thought appropriate to note that the particular form and arrangement of the several fingers defines, when the device is viewed in vertical section as in Figure 3, a half-conical cross-sectional shape for each grate member. This particular arrangement has been found to be especially efficient in promoting the anti-clogging action.

A feature considered to be of value is found in the fact that the grate members pivot between the operative and inoperative positions shown in Figures 1 and 4 respectively. A chain 22 is welded at 24 or otherwise fixedly connected, at one end of the chain, to the top edge portion of the plate 10. At its free or distal end, the chain 22 has links 26 adapted to receive selected fingers of the respective grate members when the grate members are swung upwardly to their inoperative positions. The chain can be swiftly and easily coiled or otherwise extended about selected fingers, and loosely interengages therewith to hold the grate members in their upwardly swung positions, thus providing full access to the interior of the drain at both sides of the plate. Either grate member may be swung upwardly independently of the other, of course, according to the needs of the particular situation.

Describing the construction in another way, it may be noted that each substantially half-conical grate member consists of a shaft pivoted at each end upon the plate 10 with the plate 10 being disposed in a vertical plane extending diametrically of the vertically disposed drain. It may further be noted that from this shaft fingers extend, said fingers being rigidly formed to such a length and shape that when pivoted into a lower position as in Figure 3, the distal ends of the fingers will engage the upper surface of the circumference or perimeter of the intake, thus forming the grate or slotted guard and offering protection against the entry of vermin or debris. Further referring to Figure 3, it will be seen that each of said fingers, in its lowered position, forms the hypotenuse of a right triangle, the base of which is defined by the horizontal plane of the upper surface of the intake, and the altitude of which is defined by a line coinciding with the vertical plane of the swirl plate 10. Further, all the fingers diverge in a direction away from the shaft 16 to the intake circumference.

The swirl plate, further, extends both above and below the grate defined by the several fingers. Again this is shown in Figure 3, it being seen that the lower edge of the swirl plate lies in a horizontal plane disposed very close to a horizontal plane common to the distal ends of all the fingers of both grates. It will be further noted that the swirl plate extends upwardly above the upper extremities of the several fingers, a substantial distance equal, more or less, to the distance that the swirl plate extends downwardly from said upper edges of the fingers. Still further, the swirl plate projects a substantial distance outwardly, radially beyond the circumference of the drain D. By reason of this arrangement, debris approaching the drain from one side is prevented by the swirl plate from reaching the other side, and thus, if in a particular situation water is approaching the drain mainly from one side, the other side remains unclogged. Further, the particular form and arrangement of the swirl plate relative to the grate members is such as to not only minimize the possibility of both grate members being clogged, but also, the swirl plate is very effective, more so than other swirl plates heretofore devised, in breaking up the flow of water. This is done in a way such as to preclude the violent whirlpooling or swirling action that has been noted, and that affects adversely the efficiency of the drain in carrying off the great volume of water approaching the same.

Of course, the swirl plate might be attached in various other ways, as for example, instead of stakes it might be imbedded in the upper end of the tile 20 at the time the tile is being installed. Then again, the tile 20 may have lugs or other connecting means, designed to cooperate with fastening or connecting elements on the swirl plate, so as to connect the swirl plate directly to the tile. The stakes, in other words, are merely one example of various anchoring means that could be employed to advantage.

It will be noted, in this connection, that the grate members are so arranged relative to the swirl plate as to serve the additional function of bracing the swirl plate against tilting out of its assigned vertical plane. The particular manner in which the several fingers diverge from the swirl plate and rest upon the circumference of the tile is such that although one might ordinarily suppose that the distal ends of the fingers would slide freely upon the tile, they would in fact bind against the tile in the present instance in the event that the swirl plate tends to tilt under violent buffeting received at one or the other face thereof. The grate members, thus, serve to assist in retaining the swirl plate in upright position, aiding the stakes in this regard.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In combination, a horizontal support, a drain opening to the surface of the support, said drain having an upper end, a vertical plate extending medially across the drain opening, said plate having a lower edge located close to the upper end of the drain and ends disposed at opposite sides of the drain, support-engaging means fixing said plate in place, and a guard grill mounted on a side of the plate at a location spaced above the lower edge of the plate, said grill extending downwardly around and reaching to the upper end of the drain.

2. In combination, a horizontal support, a drain opening to the surface of the support, said drain having an upper end, a vertical plate extending medially across the drain opening, said plate having a lower edge located close to the upper end of the drain and ends disposed at opposite sides of the drain, support-engaging means fixing said plate in place, and a guard grill mounted on a side of the plate at a location spaced above the lower edge of the plate, said grill extending downwardly around and reaching to the upper end of the drain, said grill comprising fingers spaced longitudinally of the plate and laterally spaced from each other and having lower ends to engage the upper end of the drain at points spaced therearound.

3. In combination, a horizontal support, a drain opening to the surface of the support, said drain having an upper end, a vertical plate extending medially across the drain opening, said plate having a lower edge located close to the upper end of the drain and ends disposed at opposite sides of the drain, support-engaging means fixing said plate in place, and a guard grill mounted on a side of the plate at a location spaced above the lower edge of the plate, said grill extending downwardly around and reaching to the upper end of the drain, said grill comprising fingers spaced longitudinally of the plate, said fingers extending downwardly and laterally outwardly from said side of the plate and having lower ends bearing upon the upper end of the drain at points spaced around the drain.

4. In combination, a horizontal support, a drain opening to the surface of the support, said drain having an upper end, a vertical plate extending medially across the drain opening, said plate having a lower edge located close to the upper end of the drain and ends disposed at opposite sides of the drain, support-engaging means fixing said plate in place, and a guard grill mounted on a side of the plate at a location spaced above the lower edge of the plate, said grill extending downwardly around and reaching to the upper end of the drain, said grill comprising fingers spaced longitudinally of the plate, said fingers extending downwardly and laterally outwardly from said side of the plate and having lower ends bearing upon the upper end of the drain at points spaced around the drain, said fingers comprising a middle finger disposed at right angles to the plate and outer fingers, said outer fingers diverging downwardly relative to the middle finger and to each other.

5. In combination, a horizontal support, a drain opening to said support and having an upper end, a vertical plate extending medially across the upper end of the drain, said plate having a lower edge located close to the upper end of the drain, support-engaging means fixing the plate in place, a downwardly and laterally outwardly angled guard grill having an upper end and a lower end, means securing the upper end of the grill to one side of said plate at a location spaced above the lower edge of the plate, with the lower end of the grill bearing upon and extending around the drain at the said one side of the plate.

6. In combination, a horizontal support, a drain opening to said support and having an upper end, a vertical plate extending medially across the upper end of the drain, said plate having a lower edge located close to the upper end of the drain, support-engaging means fixing the plate in place, a downwardly and laterally outwardly angled guard grill having an upper end and a lower end, means securing the upper end of the grill to one side of said plate at a location spaced above the lower edge of the plate, with the lower end of the grill bearing upon and extending around the drain at the said one side of the plate, said securing means being a horizontal shaft to which the upper end of the grill is fixed, and means horizontally pivoting the shaft on the plate, to enable upward pivoting of the guard on the plate to provide free access to the drain.

7. In combination, a horizontal support, a drain opening to said support and having an upper end, a vertical plate extending medially across the upper end of the drain, said plate having a lower edge located close to the upper end of the drain, support-engaging means fixing the plate in place, a downwardly and laterally outwardly angled guard grill having an upper end and a lower end, means securing the upper end of the grill to one side of said plate at a location spaced above the lower edge of the plate, with the lower end of the grill bearing upon and extending around the drain at the said one side of the plate, said securing means being a horizontal shaft to which the upper end of the grill is fixed, and means horizontally pivoting the shaft on the plate, to enable upward pivoting of the guard on the plate to provide free access to the drain, said pivot means comprising a pair of horizontally spaced ears, said shaft extending between the ears and having end portions journaled on the ears.

8. In combination, a horizontal support, a drain opening to said support and having an upper end, a vertical plate extending medially across the upper end of the drain, said plate having a lower edge located close to the upper end of the drain, support-engaging means fixing the plate in place, a downwardly and laterally outwardly angled guard grill having an upper end and a lower end, means securing the upper end of the grill to one side of said plate at a location spaced above the lower edge of the plate, with the lower end of the grill bearing upon and extending around the drain at the said one side of the plate, said securing means being a horizontal shaft to which the upper end of the grill is fixed, and means horizontally pivoting the shaft on the plate, to enable upward pivoting of the guard on the plate to provide free access to the drain, said pivot means comprising a pair of horizontally spaced ears, said shaft extending between the ears and having end portions journaled on the ears, said shaft end portions extending outwardly beyond the ears, said grill comprising end fingers fixed to said outer end portions at the outer sides of the ears, and other fingers fixed to the shaft between the ears.

References Cited in the file of this patent
UNITED STATES PATENTS

| | | |
|---|---|---|
| 188,842 | Beebe | Mar. 27, 1877 |
| 246,930 | West | Sept. 13, 1881 |
| 738,630 | Rummel | Sept. 8, 1903 |
| 945,989 | Sponenbarger | Jan. 11, 1910 |
| 1,011,669 | Temme | Dec. 12, 1911 |
| 1,397,471 | Walker | Nov. 15, 1921 |
| 1,552,902 | Werner | Sept. 8, 1925 |
| 2,494,086 | Curtis | Jan. 10, 1950 |